United States Patent
De Roest et al.

(10) Patent No.: US 9,062,735 B2
(45) Date of Patent: Jun. 23, 2015

(54) SUPPORT CONSTRUCTION, FIXING ELEMENT AND METHOD

(75) Inventors: Anton Herrius De Roest, Enschede (NL); Marco Jan Antoni Freriksen, Hengelo (NL)

(73) Assignee: MECAL APPLIED MECHANICS B.V., Enschede (NL)

( * ) Notice: Subject to any disclaimer, the term of this patent is extended or adjusted under 35 U.S.C. 154(b) by 1701 days.

(21) Appl. No.: 11/665,573

(22) PCT Filed: Oct. 20, 2005

(86) PCT No.: PCT/NL2005/000757
§ 371 (c)(1),
(2), (4) Date: Feb. 28, 2008

(87) PCT Pub. No.: WO2006/043814
PCT Pub. Date: Apr. 27, 2006

(65) Prior Publication Data
US 2008/0185496 A1 Aug. 7, 2008

(30) Foreign Application Priority Data
Oct. 20, 2004 (NL) .................................... 1027304

(51) Int. Cl.
*F16F 7/12* (2006.01)
*F16F 3/10* (2006.01)
*E04H 9/02* (2006.01)

(52) U.S. Cl.
CPC *F16F 3/10* (2013.01); *E04H 9/021* (2013.01); *F16F 7/12* (2013.01); *F16F 2228/066* (2013.01)

(58) Field of Classification Search
None
See application file for complete search history.

(56) References Cited

U.S. PATENT DOCUMENTS

| | | | |
|---|---|---|---|
| 3,249,330 A | 5/1966 | Preis et al. | |
| 3,624,764 A | 11/1971 | Goben | |
| 3,794,277 A | 2/1974 | Smedley et al. | |
| 4,200,256 A | 4/1980 | Thiel | |
| 4,533,109 A | 8/1985 | Delam | |
| 4,593,502 A * | 6/1986 | Buckle | 52/167.7 |
| 4,599,834 A * | 7/1986 | Fujimoto et al. | 52/167.8 |
| 4,633,628 A * | 1/1987 | Mostaghel | 52/167.7 |
| 4,662,142 A | 5/1987 | Weiner | |
| 5,452,548 A * | 9/1995 | Kwon | 52/167.8 |

(Continued)

FOREIGN PATENT DOCUMENTS

DE 42 10 598 10/1993
WO WO 02/08629 1/2002

OTHER PUBLICATIONS

International Search Report corresponding to PCT/NL2005/000757, under date of mailing of Feb. 9, 2006.

*Primary Examiner* — Alfred J Wujciak
(74) *Attorney, Agent, or Firm* — Quarles & Brady LLP (57) ABSTRACT

The invention relates to a support construction (1) for fabrication equipment of microscopic structures, comprising a monolithic foundation body (3) on which, for fixing the fabrication equipment, a fixing element (6) is provided comprising a resilient element. The fixing element further comprises a rigid element (10) whose rigidity decreases significantly when applying a dynamic force to the fixing element which force exceeds a predetermined threshold value. The support construction is further designed such that, regardless of the size of the dynamic force applied to the fixing element, a static force applied to the fixing element is substantially transmitted via the resilient element to the foundation body.

17 Claims, 8 Drawing Sheets

(56) References Cited

U.S. PATENT DOCUMENTS

| | | |
|---|---|---|
| 5,478,058 A | 12/1995 | Tucchio et al. |
| 5,816,559 A * | 10/1998 | Fujimoto ...................... 248/636 |
| 5,964,066 A * | 10/1999 | Mori ........................... 52/167.1 |
| 6,377,132 B1 * | 4/2002 | Wakamatsu et al. .......... 333/134 |
| 6,571,046 B1 * | 5/2003 | Hickey et al. ................. 385/134 |
| 6,703,836 B2 * | 3/2004 | Ladebeck et al. ............. 324/318 |
| 6,739,568 B2 * | 5/2004 | Whittaker et al. ............. 248/638 |
| 7,051,588 B1 * | 5/2006 | Maltby ........................... 73/161 |
| 7,145,270 B2 * | 12/2006 | Mizuno ...................... 310/12.19 |
| 7,489,493 B2 * | 2/2009 | Thaveeprungsriporn et al. ............................. 361/220 |
| 7,757,441 B1 * | 7/2010 | Whittaker .................... 52/167.4 |
| 2002/0171024 A1 | 11/2002 | Burkhardt |
| 2006/0179729 A1 * | 8/2006 | Li ................................ 52/167.7 |

* cited by examiner

SUPPORT CONSTRUCTION, FIXING ELEMENT AND METHOD

The invention relates to a support construction for fabrication equipment of microscopic structures, comprising a monolithic foundation body on which, for fixing the fabrication equipment, a fixing element is provided which comprises a rigid element.

Such support constructions are known per se for supporting, for instance, lithographic equipment. In view of the combination of, on the one side, large accelerations and forces which occur in lithographic equipment and, on the other side, high requirements with respect to the desired accuracies in displacements of modules in the equipment, it is desirable to realize a rigid construction which is anchored in a foundation body with a relatively large inertia. To this end, the equipment is founded, by means of the rigid element of the fixing element, on the monolithic foundation body.

A drawback of such a construction is the susceptibility of the equipment to movements of the foundation body resulting from displacements of the underground when, for instance, earthquakes or earth tremors occur. After a calamity where undesired high accelerations occur in the earth's crust, it is often necessary to reset or even entirely replace sensitive modules of the equipment, such as optical elements in lithographic equipment. In particular in areas where earthquakes or earth tremors occur relatively often, the costs of repair can be considerable.

The object of the invention is to provide a support construction for fabrication equipment of microscopic structures in which the drawbacks mentioned are avoided while maintaining the advantages. The object of the invention is in particular, to provide a support construction with which great forces in combination with current high requirements regarding displacement accuracies of modules in the equipment can be realized, while damage as a result of earthquakes and earth tremors is prevented in a, to a certain extent, controllable manner. To that end, the fixing element further comprises a resilient element whose rigidity decreases significantly when applying a dynamic force to the fixing element which force exceeds a predetermined threshold value, the support construction being further designed such that regardless of the magnitude of a dynamic force applied to the fixing element, a static force applied to the fixing element is transmitted substantially via the resilient element to the foundation body.

By combining the rigid element, whose rigidity decreases significantly at sufficient dynamic force, with a resilient element, a support construction is obtained with which the dynamics of the monolithic foundation body in the case of great forces in the earth's surface as a result of, for instance, geological activity, are mechanically uncoupled to some extent from the sensitive modules in the equipment so that damage in the equipment is prevented. The fact is that then the rigidity of the integral construction is reduced without significant displacements of the equipment. However, during normal use of the equipment, still, a rigid construction is realized with the foundation body so that the requirements regarding dynamic behavior and the extreme accuracy remain technically feasible.

By further designing the support construction such that, regardless of the magnitude of a dynamic force applied to the fixing element, a static force applied to the fixing element is transmitted substantially via the resilient element to the foundation body, a support construction is obtained wherein the material properties of the rigid element, depending on forces applied to the rigid element in particular with respect to rigidity and, optionally, breakage, can be determined relatively accurately in advance, as the ratio of the dynamic load with respect to the static load of the rigid part is relatively high. As a result, the dynamic behavior of the rigid element can be pre-set more accurately and more reliably, so that uncoupling and, hence, protection of the equipment enters into operation on the basis of predetermined criteria.

It is noted that from U.S. Pat. No. 3,794,277 a support construction is known for supporting sensitive structures such as instrumentation equipment, wherein damage as a result of earthquakes is prevented. The support construction described in the publication also comprises a fixing element with a rigid element and a resilient element. However, contrary to the invention, in normal use, the static force, that is the supported weight, is transmitted substantially via the rigid element to an underground. As a result, the ratio of the dynamic load with respect to static load is relatively low, so that when dynamically loaded, the rigidity characteristic of the rigid element is more difficult to predict. Furthermore, when dynamic overload occurs, the support construction gives relatively far, which is undesirable when used for fabrication equipment of microscopic structures, due to the accelerations occurring in the equipment as a result thereof.

Preferably, the fixing element supports the fabrication equipment while the static force applied to the fixing element comprises the weight of the fabrication equipment. As a result, the dynamic, vertical forces occurring at earth crust displacements can be absorbed in an elegant manner. Naturally, it is also possible to arrange the fixing element to absorb substantially horizontally oriented forces so that the equipment is also protected against accelerations and/or forces in the horizontal plane. In an advantageous manner, the predetermined threshold value for a dynamic vertical force differs from the predetermined threshold value for a dynamic horizontal force, so that uncoupling in the various geometric directions can be set to be optimal. This may be of importance if the maximum admissible accelerations in the equipment are orientation dependent and/or dependent on the specific suspension of the equipment relative to various fixing elements as to, for instance, weight distribution and orientation of the fixing elements relative to the equipment.

It is noted that what is meant by transmitting the static force applied to the fixing element substantially via the resilient element to the foundation body is, that more than half the static force is transmitted via the resilient element. Preferably however, more than 80%, for instance 90% of the static force is transmitted via the resilient element so that the ratio of the admissible dynamic force relative to the static force applied to the rigid element increases, which is advantageous for setting a desired rigidity characteristic of the rigid element, as described hereinabove.

It is further noted that a monolithic foundation body is understood to mean a rigid foundation body or floor construction in which, optionally, a specific body, such as a frame, has been integrated. The fixing element can also be provided on the foundation body via a footplate or setting plate, also called 'insert'.

A static force is understood to mean a force which virtually does not vary over time while a dynamic force is understood to mean a force which varies strongly over time, such as a temporary force of a few seconds or minutes as a result of an earthquake.

The invention also relates to a fixing element.

The invention further relates to a method for repairing a support construction.

The invention will be further elucidated with reference to exemplary embodiments represented in the drawing. In the drawing.

The Figures are only schematic representations of preferred embodiments of the invention. In the Figures, identical or corresponding parts are designated with the same reference numerals.

Figure 1:
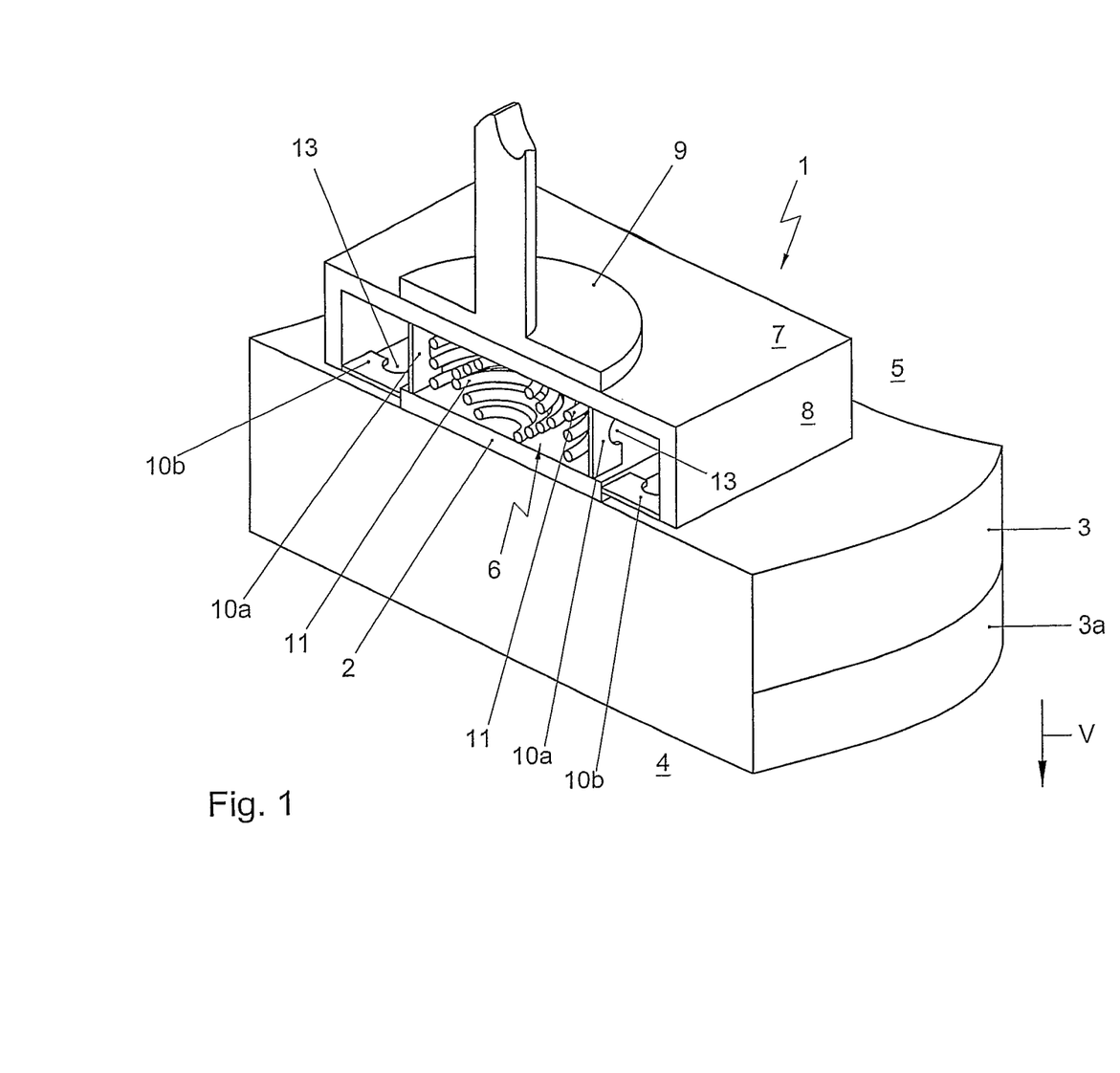
FIG. 1 shows a schematic, perspective view of a cross-section of a first embodiment of a support construction according to the invention.
Figure 2:
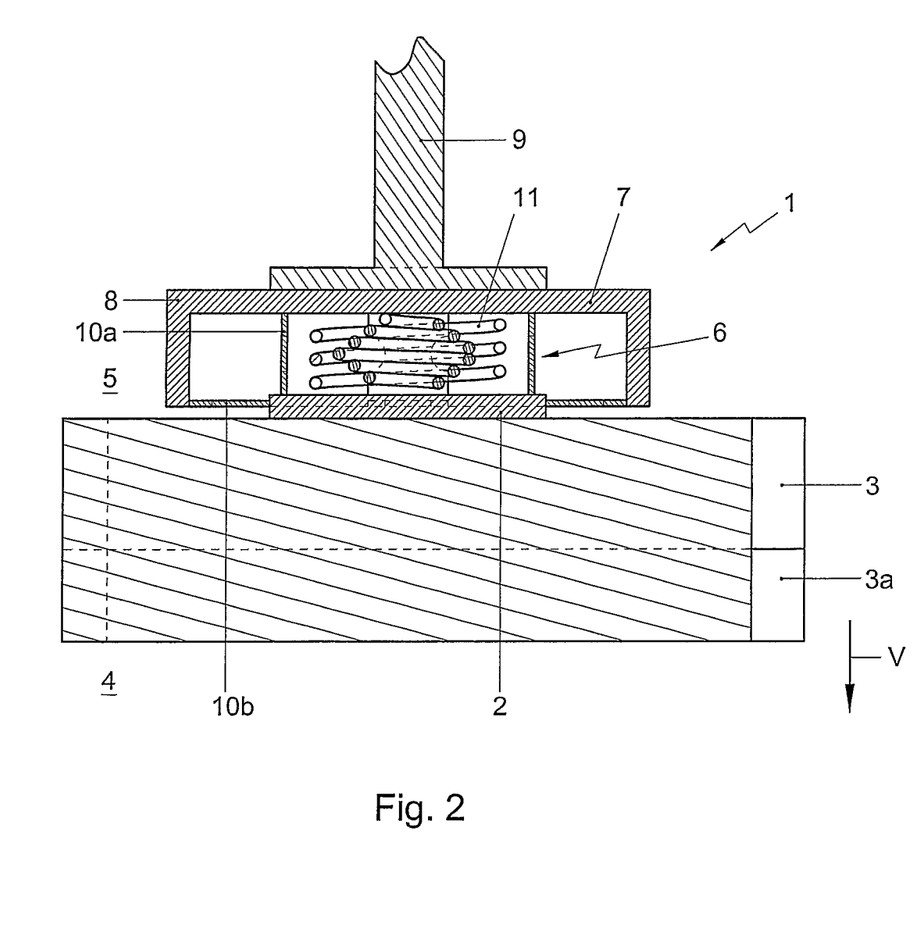
FIG. 2 shows a schematic side view of the support construction of FIG. 1.
Figure 3:
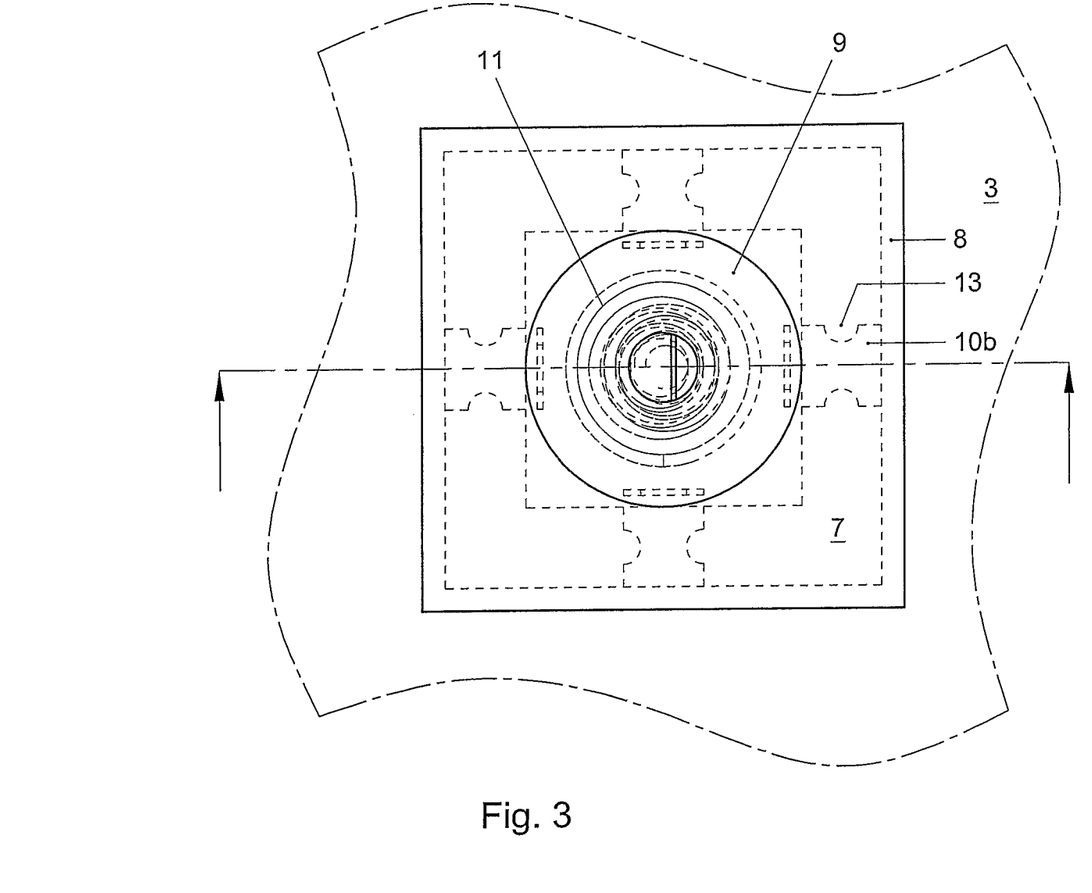
FIG. 3 shows a schematic top plan view of the support construction of FIG. 1.

In FIG. 1, a first embodiment is shown of a perspective view of a cross-section of a support construction 1 according to the invention. FIGS. 2 and 3 show a schematic side view and top plan view, respectively, of this support construction 1. The support construction 1 comprises a monolithic foundation body 3 placed on a concrete floor 3a which rests on foundation piles (not shown) of steel and/or concrete. The space 4 below the concrete floor 3a is arranged for instruments which need not necessarily function in a dust-free space and/or generate many dust particles. By contrast, the space 5 above the concrete floor is dust-free during use with the aid of an atmosphere control system, which is often a prerequisite for the production of microscopic structures such as integrated circuits. The foundation body 3 can be anchored in the concrete floor 3a or be attached to the floor 3a by other attachment means, for instance by a glue connection such as an epoxy.

The support construction further comprises a fixing element 6 which is provided on the foundation body 3 via a steel footplate which is attached to the foundation body with the aid of a hard glue layer such as epoxy, and fixes a top plate 7 with side plates 8. Then, on the top plate is placed a machine foot 9 on which fabrication equipment designed as lithography equipment has been fixed (not shown). Optionally, the fixing element is included in the foundation body 3 and/or in the top plate 7. The fixing element 6 comprises rigid elements designed as rigid strips 10 of amorphous crystalline material, as well as resilient elements designed as helical springs 11. The weight of the top plate 7, sidewalls 8, machine foot 9 and lithography equipment is transmitted for the greater part, for instance 90%, via the springs 11 to the foundation plate 2. Only a limited part, for instance 10%, of the static weight is supported by the vertically positioned rigid strips 10a. Owing to the rigid construction of the strips 10a, all dynamic forces are transmitted by the strips 10a in the vertical direction V to the foundation plate 3. When the dynamic forces mentioned exceed a predetermined threshold value, for instance during an earthquake or other seismic activities, the rigidity of the strips 10a decreases significantly, so that then, the full weight of top plate 7, side walls 8, machine foot 9 and lithography equipment is supported by the springs 11. As a result, too violent accelerations in and/or forces on the equipment are prevented so that costs for repair and setting can be saved, or damages can be limited.

A protection against violent accelerations in the horizontal plane, transverse to the vertical direction V, is realized in a comparable manner by strips 10b with a rigidity characteristic which decreases significantly after reaching a predetermined threshold value. The top plate 7, side walls 8, machine foot and lithography equipment is then fixed by springs (not shown) which are compressible in a horizontal direction. The strips 10b can also be advantageously integrated in a resilient medium.

Thus, expensive, sensitive modules in the lithography equipment are protected against external forces and/or accelerations resulting from oscillations in the foundation plate 3 as a result of, for instance, seismic activities. These modules however are also protected from damage caused by an incorrect setting or a defect of a violently oscillating module in the equipment itself, or by other internal machine dynamics.

The springs 11 are preferably biased so that the spring force developed thereby is utilized for supporting the larger part of the weight in a static equilibrium. When significant reduction in the rigidity of the rigid elements 10a occurs a vertical displacement too remains limited, so that the risk of damage to the lithography equipment is reduced. Optionally, the resilient element can be biased for the purpose of transmitting horizontal static forces can. In the case no static forces are active in horizontal direction, naturally, biasing the resilient element for transmitting horizontal forces can be omitted.

What is achieved by designing the springs 11 to be chemically inert and/or shrink-proof and/or ride-proof, is that the resilient properties are hardly influenced, if at all, by any chemicals that may be released, or temperature fluctuations, respectively.

The number of springs 11, or, more generally, the number of resilient elements and the specific engagement on the lithography equipment can be selected depending on, for instance, weight distribution and possible orientation of the resilient elements relative to the equipment.

Figure 4:
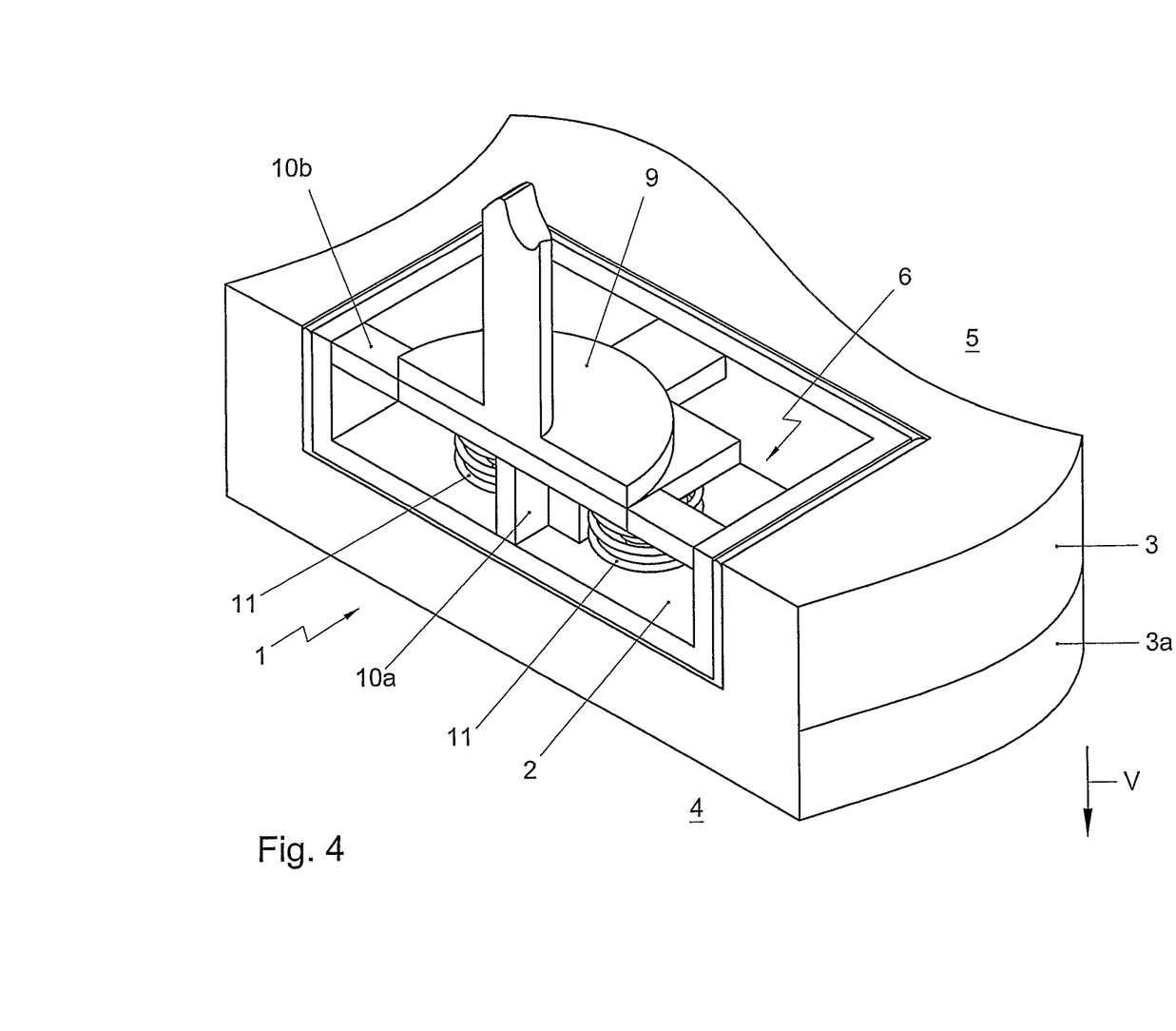
FIG. 4 shows a schematic perspective view of a cross-section of a second embodiment of a support construction according to the invention.

A second embodiment of a support construction 1 according to the invention, shown in FIG. 4, is embedded in the floor 3a. In this embodiment, the strips 10 are not provided with recesses. Further, the vertical strips 10a are placed centrally, while the resilient elements designed as springs 11 are placed off-center. Depending on the specific design of the fabrication equipment to be fixed, it can be advantageous, in view of possible repairs, to place the rigid elements centrally or, conversely, de-centralized.

Figure 5:
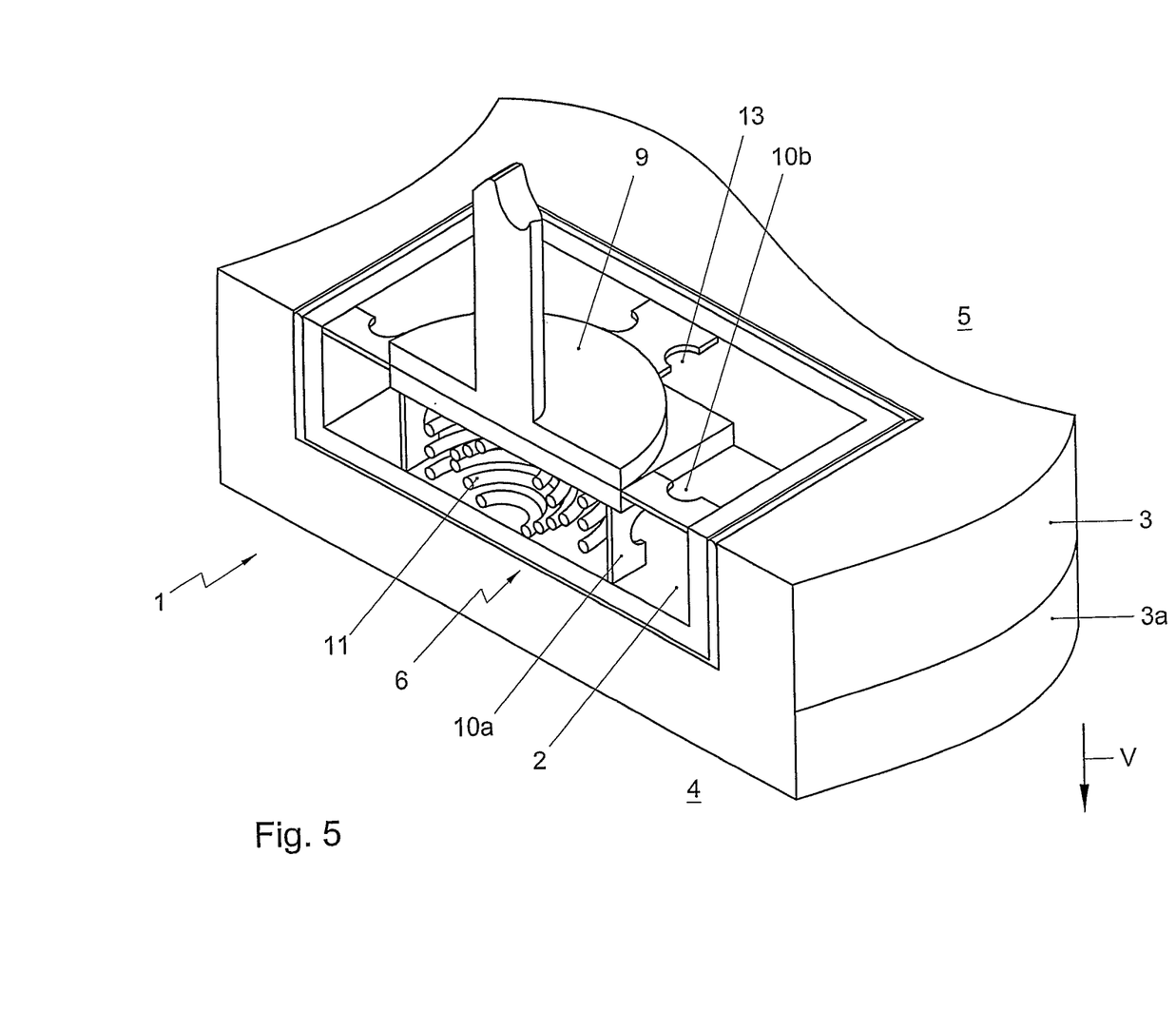
FIG. 5 shows a schematic perspective view of a cross-section of a third embodiment of a support construction according to the invention.

A third embodiment of a support construction 1 according to the invention is represented in FIG. 5. This embodiment resembles the first embodiment, see FIG. 1. However, in FIG. 5 too, the support construction is embedded in the floor 3.

Figure 6:
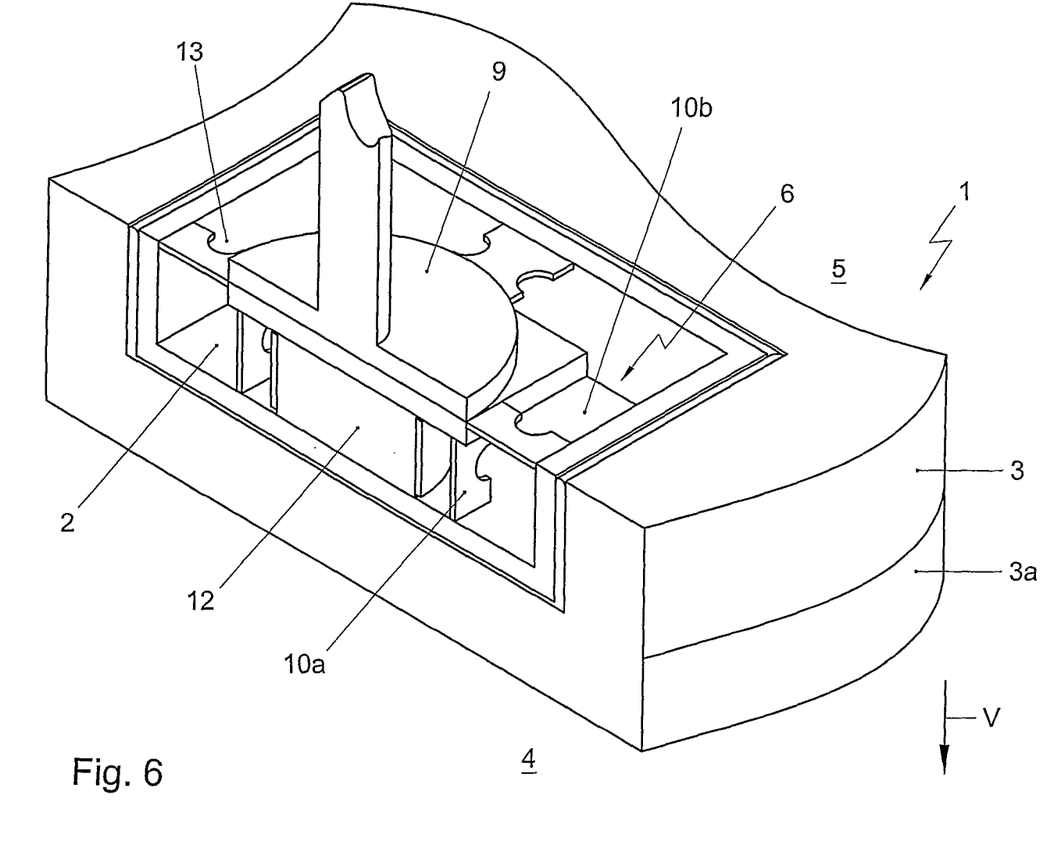
FIG. 6 shows a schematic perspective view of a cross-section of a fourth embodiment of a support construction according to the invention.

In the first embodiment, the resilient elements are designed as metal springs 11. Naturally, it is also possible to implement the resilient function differently, with the aid of, for instance, a homogenous resilient material such as a rubber, preferably a fluorine rubber. In FIG. 6, an embodiment of a support construction 1 according to the invention is described wherein the resilient elements are designed as a rubber disc 12. Again, the support construction 1 in FIG. 6 is embedded in the concrete floor 3a.

In an advantageous manner, the rigid strips 10a, 10b are designed to be frangible so that in a simple manner, an element is obtained which, up to a predetermined threshold value of a dynamic force, has a fairly constant rigidity which abruptly decreases when said threshold value is exceeded as then, the strip deforms irreversibly. Naturally, it is also possible to realize an irreversible deformation in a different manner by a choice of, for instance, geometry of the strips.

The predetermined threshold value of a rigid element can be set by selecting, for instance, dimensions such as length, width, diameter, material type and/or aftertreatment of the material. As shown in FIGS. 1 and 3, the rigid element 10 can also be provided with recesses 13 and/or indentations and/or reinforcements for setting the threshold value.

Figure 8:
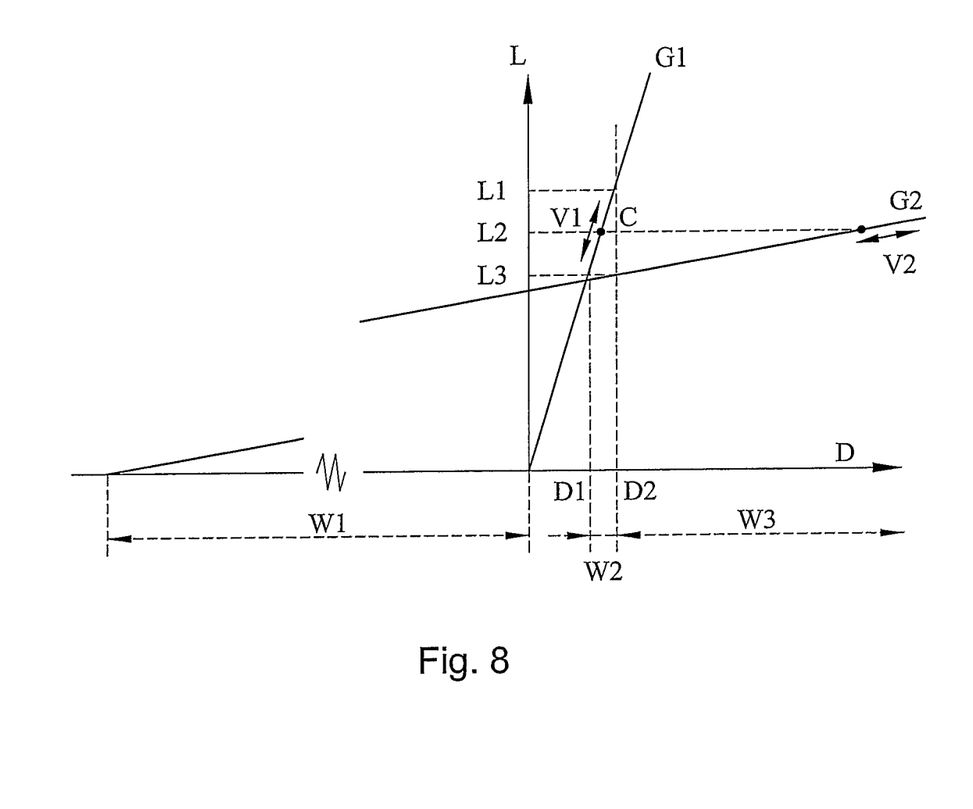
FIG. 8 shows a graphic representation of the rigidity characteristic of a fixing element.

FIG. 8 shows a graphic representation of the rigidity behavior of the fixing element depending on loads exerted thereon. Curve G1 and G2 represent the rigidity of the rigid element and the resilient element, respectively, as function of the load L and the deformation D. As is apparent from the graph, the resilient element is biased with a deformation W1. During normal use, the rigidity of the fixing element is represented by point C, while a static load L2 is involved. As a result of the dynamic loads, a variation V1 is possible along curve G1 between threshold values L1 and L3 and associated deformations D1 and D2 with a relatively small deformation difference W2. The fact is that then, the rigidity of the fixing element is determined by the rigid element. When the dynamic load exceeds a critical threshold the size of L1-L2 or L2-L3, the rigid element breaks so that the rigidity is then fully determined by the resilient element, represented by curve G2. Variation in the load and deformation is indicated by the variation V2 along curve G2.

After an irreversible deformation of the rigid element, such as with breakage, the behavior of the fixing element is therefore described by G2 in the so-called low rigidity region, wherein a relatively small load causes a relatively great deformation of the element and the equipment. Here, the rigidity of the fixing element can be selected such that a low frequent spring-mounted construction is formed so that the equipment is subject only to limited accelerations which are the result of forces applied to the foundation body, such as an earthquake. As a result, further damage to the equipment is prevented when, for instance, further earth tremors occur. The construction is preferably spring-mounted, depending on the orientation, on a frequency between 1 and 3 Hz. Further provisions may be made, for that matter, for damping the fixing element and the equipment by providing, for instance, balancers or other constructions so that damage to the equipment is prevented further.

After this deformation of the rigid element, the support construction can be repaired by replacing the rigid element if the rigid element is designed separately. The repair operation can be carried out by temporarily diverting the forces applied to the fixing element 6 with the aid of an auxiliary element. It is also possible to replace the support construction integrally by removing, for instance, a glue layer with which the construction is attached to the concrete floor.

The invention is not limited to the exemplary embodiments described here. Many variations are possible.

For instance, such a support construction can not only be used for supporting lithography equipment, but also for other manufacturing and inspection equipment of microscopic structures such as micro electromechanical systems (MEMS), nano-technological products and/or biochemical products.

Further, the rigid element can not only be designed as a passive element, but can also be controlled actively, for instance by detecting, with the aid of sensors often already present in the equipment to be fixed, inadmissible accelerations and controlling an active rigid element. Such an active rigid element can be designed as represented in the fifth embodiment of a support construction, shown in FIG. 7. A bend-shaped section 15, for instance of metal, encloses in its center a metal cylinder 16 which, in normal operation, is pulled downwards under the influence of a magnetic field, generated by a coil 17 located therebeneath, and is thus rigidly fixed on a predetermined location. After detection of an acceleration above a predetermined threshold value, this fixation is removed, for instance by switching off the coil 17, so that the section 15 can hinge easily in order to reduce the rigidity in the longitudinal direction of the section, as desired. To this end, a piezo element can also be used.

Figure 7:
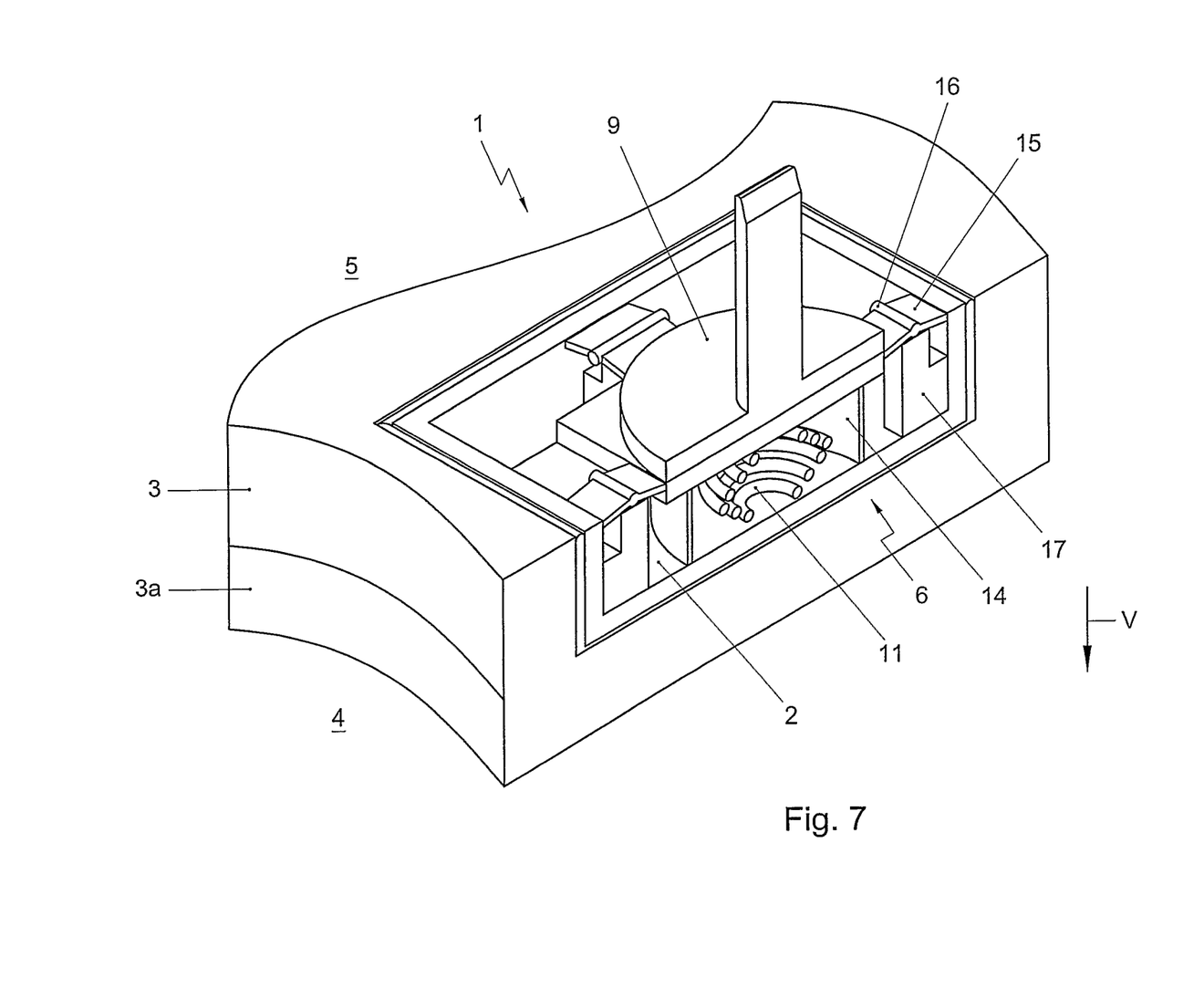
FIG. 7 shows a schematic perspective view of a cross-section of a fifth embodiment of a Support construction according to the invention.

In addition, the rigid element can exhibit a geometry other than a strip (FIG. 1) or a block (FIG. 4), for instance a rotation symmetrical section such as a hollow cylinder 14 represented in FIG. 7. The hollow cylinder 14 is for instance designed in glass.

In an elegant manner, the rigid element comprises a crystal-shaped structure, such as an octahedron, which is embedded in a resilient material so that the rigidity of the material decreases when a dynamic force in a predetermined direction exceeds a predetermined threshold value through breakage of the ribs of the crystal-shaped structure.

Such variants will be clear to the skilled person and are understood to fall within the range of the invention as set forth in the following claims.

The invention claimed is:

1. A support construction for fabrication equipment of microscopic structures, comprising:
    a monolithic foundation body, on which, for fixing the fabrication equipment, a fixing element is provided which comprises a resilient element, the fixing element further comprising a rigid element whose rigidity decreases significantly when applying a dynamic force to the fixing element which force exceeds a predetermined threshold value, the support construction being further designed such that, regardless of the magnitude of a dynamic force applied to the fixing element, a static force applied to the fixing element by the fabrication equipment is transmitted substantially via the resilient element to the foundation body, the balance of the static force applied to the fixing element by the fabrication equipment is transmitted via the rigid element to the foundation body.

2. A support construction according to claim 1, wherein the fixing element is adapted to support the fabrication equipment and wherein the static force applied to the fixing element comprises the weight of the fabrication equipment.

3. A support construction according to claim 1, wherein the fixing element absorbs substantially horizontally orientated forces.

4. A support construction according to claim 1, wherein the predetermined threshold value of a substantially horizontally orientated dynamic force differs from the predetermined threshold value of a substantially vertically orientated dynamic force.

5. A support construction according to claim 1, wherein more than 80% of the static force applied to the fixing element is transmitted via the resilient element to the foundation body.

6. A support construction according to claim 1, wherein the resilient element is biased.

7. A support construction according to claim 1, wherein the resilient element is chemically inert.

8. A support construction according to claim 1, wherein the resilient element is shrink-proof and/or ride-proof.

9. A support construction according to claim 1, wherein the resilient element comprises steel.

10. A support construction according to claim 1, wherein the rigid element is frangible.

11. A support construction according to claim 1, wherein the rigid and/or resilient element is designed to be rotation symmetrical.

12. A support construction according to claim 1, wherein the rigid element and the resilient element are integrated.

13. A support construction according to claim 1, wherein the rigidity of the rigid element is magnetically adjustable.

14. A support construction for fabrication equipment of microscopic structures, comprising:

a monolithic foundation body, on which, for fixing the fabrication equipment, a fixing element is provided which comprises a resilient element, the fixing element further comprising a rigid element whose rigidity decreases significantly when applying a dynamic force to the fixing element which force exceeds a predetermined threshold value, the support construction being further designed such that, regardless of the magnitude of a dynamic force applied to the fixing element, a static force applied to the fixing element by the fabrication equipment is transmitted substantially via the resilient element to the foundation body, the balance of the static force applied to the fixing element by the fabrication equipment is transmitted via the rigid element to the foundation body, wherein the rigid element comprises amorphous crystalline material.

15. A support construction according to claim 1, wherein the rigid element, when the predetermined threshold value is exceeded, deforms irreversibly.

16. A method for repairing a support construction according to claim 1 after an irreversible deformation according to claim 15, wherein forces, applied to the fixing element are transmitted via an auxiliary element for a temporary period of time during which the rigid element is replaced.

17. A fixing element for supporting fabrication equipment of microscopic structures comprising:

a rigid element; and a resilient element;

wherein the rigidity of the rigid element decreases significantly when a dynamic force exceeding a predetermined threshold value is applied to the fixing element, and regardless of the magnitude of a dynamic force applied to the fixing element, the fixing element is adapted to transmit a static force applied to the fixing element by the fabrication equipment to a monolithic foundation body substantially via the resilient element, with the balance of the static force applied to the fixing element by the fabrication equipment being transmitted to the foundation body via the rigid element.

* * * * *